US012252606B2

(12) United States Patent
Franosch et al.

(10) Patent No.: US 12,252,606 B2
(45) Date of Patent: Mar. 18, 2025

(54) COMPOSITES HAVING A THERMOPLASTIC MATRIX

(71) Applicant: Evonik Operations GmbH, Essen (DE)

(72) Inventors: Jürgen Franosch, Marl (DE); Andreas Szentivanyi, Essen (DE); Hans Ries, Marl (DE); Horst Beyer, Marl (DE)

(73) Assignee: Evonik Operations GmbH, Essen (DE)

( * ) Notice: Subject to any disclaimer, the term of this patent is extended or adjusted under 35 U.S.C. 154(b) by 405 days.

(21) Appl. No.: 17/275,274

(22) PCT Filed: Sep. 19, 2019

(86) PCT No.: PCT/EP2019/075171
§ 371 (c)(1),
(2) Date: Mar. 11, 2021

(87) PCT Pub. No.: WO2020/058403
PCT Pub. Date: Mar. 26, 2020

(65) Prior Publication Data
US 2022/0041849 A1    Feb. 10, 2022

(30) Foreign Application Priority Data

Sep. 21, 2018 (EP) .................................. 18195870

(51) Int. Cl.
| | | |
|---|---|---|
| C08L 27/16 | (2006.01) | |
| C08J 5/04 | (2006.01) | |
| C08K 7/06 | (2006.01) | |
| C09J 7/30 | (2018.01) | |
| C09J 127/16 | (2006.01) | |
| F16L 9/12 | (2006.01) | |

(52) U.S. Cl.
CPC .............. *C08L 27/16* (2013.01); *C08J 5/042* (2013.01); *C08K 7/06* (2013.01); *C09J 7/30* (2018.01); *C09J 127/16* (2013.01); *F16L 9/12* (2013.01); *F16L 9/121* (2013.01); *F16L 9/123* (2013.01); *C08J 2327/16* (2013.01); *C08J 2433/14* (2013.01); *C09J 2427/00* (2013.01); *C09J 2433/00* (2013.01)

(58) Field of Classification Search
None
See application file for complete search history.

(56) References Cited

U.S. PATENT DOCUMENTS

| | | | |
|---|---|---|---|
| 2,146,209 A | 2/1939 | Graves | |
| 4,246,374 A | 1/1981 | Kopchik | |
| 4,883,625 A | 11/1989 | Glemet et al. | |
| 5,002,712 A | 3/1991 | Goldmann et al. | |
| 5,510,160 A * | 4/1996 | Jadamus | B32B 1/08 |
| | | | 428/36.9 |
| 5,554,426 A * | 9/1996 | Rober | B32B 1/08 |
| | | | 428/476.3 |
| 8,133,561 B2 * | 3/2012 | Schmitz | B32B 3/28 |
| | | | 428/474.9 |
| 8,524,342 B2 | 9/2013 | Haeger et al. | |
| 8,883,898 B2 | 11/2014 | Hochstetter et al. | |
| 9,133,965 B2 | 9/2015 | Goering et al. | |
| 9,151,418 B2 | 10/2015 | Goering et al. | |
| 9,309,998 B2 | 4/2016 | Kuhmann et al. | |
| 9,314,989 B2 | 4/2016 | Kuhmann et al. | |
| 9,551,441 B2 | 1/2017 | Dowe et al. | |
| 9,556,358 B2 | 1/2017 | Berger et al. | |
| 10,113,671 B2 | 10/2018 | Franosch et al. | |
| 10,816,113 B2 | 10/2020 | Berger et al. | |
| 10,836,136 B2 | 11/2020 | Berlin et al. | |
| 2009/0155570 A1 * | 6/2009 | Bonnet | C09D 151/06 |
| | | | 428/327 |
| 2011/0166278 A1 | 7/2011 | Hochstetter et al. | |
| 2012/0077398 A1 | 3/2012 | Gaillard et al. | |
| 2013/0025734 A1 | 1/2013 | Kuhmann et al. | |
| 2013/0032240 A1 | 2/2013 | Kuhmann et al. | |
| 2013/0333788 A1 | 12/2013 | Johnson et al. | |
| 2014/0191437 A1 | 7/2014 | Johnson et al. | |
| 2016/0271918 A1 | 9/2016 | Berger et al. | |
| 2018/0001516 A1 | 1/2018 | Berlin et al. | |
| 2018/0057748 A1 * | 3/2018 | Hochstetter | C08K 3/38 |
| 2018/0111350 A1 * | 4/2018 | Berlin | B32B 37/1284 |

(Continued)

FOREIGN PATENT DOCUMENTS

| | | |
|---|---|---|
| CN | 105984192 A | 10/2016 |
| CN | 108286627 A | 7/2018 |

(Continued)

OTHER PUBLICATIONS

Nuyken et al., "Polymers of Acrylic Acid, Methacrylic Acid, Maleic Acid, and Their Derivatives," copyright 1992, Handbook of Polymer Synthesis, Part A, Chapter 4, Marcel Dekker, Inc., pp. 223-336 (116 pages).
German language International Search Report mailed on Nov. 6, 2019 in PCT/EP2019/075171 (4 pages).
International Search Report mailed on Nov. 6, 2019 in PCT/EP2019/075171 (2 pages).
Written Opinion mailed on Nov. 6, 2019 in PCT/EP2019/075171 (4 pages).
Elias, Makromolekule, Chapter 10, Carbon-Nitrogen Chains, Copyright 2001, Wiley-VCH Verlag GmbH, pp. 445-528 (84 pages).

*Primary Examiner* — Megan McCulley

(74) *Attorney, Agent, or Firm* — Grüneberg and Myers PLLC

(57) ABSTRACT

The present invention is directed to continuous fiber-reinforced composites having a matrix of modified PVDF. The composite may be a semifinished product or a product or finished part manufactured therefrom. A product according to the invention is pelletized long-fiber material, while a finished part according to the invention is especially a thermoplastic composite pipe.

21 Claims, No Drawings

(56) References Cited

U.S. PATENT DOCUMENTS

| | | | |
|---|---|---|---|
| 2018/0195646 A1 | 7/2018 | Berger et al. | |
| 2018/0195647 A1 | 7/2018 | Berger et al. | |
| 2018/0297239 A1 | 10/2018 | Berlin et al. | |
| 2020/0248844 A1 | 8/2020 | De Aquino et al. | |
| 2021/0343265 A1* | 11/2021 | Ohishi | B32B 27/08 |

FOREIGN PATENT DOCUMENTS

| | | |
|---|---|---|
| CN | 108214980 B | 8/2021 |
| EP | 0 056 703 A1 | 7/1982 |
| EP | 0 673 762 A2 | 9/1995 |
| EP | 3 069 875 A1 | 9/2016 |
| EP | 3 345 749 A1 | 7/2018 |
| FR | 2918082 A1 | 1/2009 |
| WO | 1995/007428 A1 | 3/1995 |
| WO | 1999/067561 A1 | 12/1999 |
| WO | 2002/095281 A1 | 11/2002 |
| WO | 2006/107196 A1 | 10/2006 |
| WO | 2012/118378 A1 | 9/2012 |
| WO | 2012/118379 A1 | 9/2012 |
| WO | 2013/188644 A1 | 12/2013 |
| WO | 2014/140025 A1 | 9/2014 |
| WO | 2016/142630 A1 | 9/2016 |
| WO | 2016/156222 A1 | 10/2016 |
| WO | 2016/173886 A1 | 11/2016 |

* cited by examiner

COMPOSITES HAVING A THERMOPLASTIC MATRIX

CROSS REFERENCE TO RELATED APPLICATIONS

This application is a 35 U.S.C. § 371 U.S. national phase entry of International Application No. PCT/EP2019/075171 having an international filing date of Sep. 19, 2019, which claims the benefit of European Application No. 18195870.3 filed Sep. 21, 2018, both of which are incorporated herein by reference in its entirety.

FIELD

The present invention is directed to continuous fiber-reinforced composites having a matrix of modified PVDF. The composite may be a semifinished product or a product or finished part manufactured therefrom. A product according to the invention is pelletized long-fiber material, while a finished part according to the invention is especially a thermoplastic composite pipe.

BACKGROUND

Composites with a PVDF matrix are known; corresponding types with glass fiber or carbon fiber reinforcement are commercially available. However, adhesion between fiber and PVDF matrix is unsatisfactory, which leads to inadequate mechanical properties. A further disadvantage is that no direct adhesion can be achieved between the composite and components included in the composite. US 2011/0166278 and WO 2016/142630 describe composites with a PVDF matrix, which are produced by preparing a mixture of PVDF and an unsaturated monomer, irradiating it with high-energy radiation and then removing the unreacted fraction of the unsaturated monomer. However, this mode of preparation is inconvenient and costly and cannot easily be converted to the production scale.

One aspect of the underlying problem is that of providing more easily produced composites with PVDF matrix and good fiber-matrix adhesion.

Composites of this kind, owing to the flame-retardant effect of the PVDF, are of high interest, for example for aircraft or motor vehicle construction. They are especially also of interest for use as reinforcing ply in thermoplastic composite pipes (TCPs) since they absorb less hydrocarbons, water or methanol from the environment or the medium being conveyed than composites with a polyamide matrix, and in particular can also be subjected to higher thermal stress in the presence of such substances. The situation is similar for the comparison with composites having a polyolefin matrix.

Flexible thermoplastic composite pipes consist at least of an inner liner pipe of a thermoplastic polymer, a multilayer wound ply of continuous fiber tapes applied thereto, these having been impregnated with a thermoplastic matrix, and an outer protective layer of thermoplastic material.

If these layers are cohesively bonded to one another, this is also referred to as a bonded composite flexible pipe. Such pipes are usually used for offshore oil production. Especially for use at great water depths, but also for reliable connection of such pipes to the respective connecting elements, for instance end fittings, and for assembly and laying operations, cohesive bonding of all the layers mentioned to one another is highly advantageous.

TCPs are described, for example, in WO 1995/007428 and WO 1999/067561. The production thereof is additionally disclosed in WO 2002/095281, WO 2006/107196, WO 2012/118378, WO 2012/118379 and WO 2013/188644. In the existing TCPs, the material of the inner liner pipe (or in the case of multilayer liners the material of the outer liner layer), the matrix material of the tape and the material of the outer protective layer ("jacket" or "cover sheet") generally consist of the same polymer, in order thus to be able to achieve very good fusion and adhesion of the wound plies to one another and to the liner and the protective layer. Depending on the maximum use temperature and application, these are usually TCPs based on polyethylene, polypropylene or PA12/PA11. At low use temperatures, for instance below 50° C., generally polyolefins are used, and above that PA11 or PA12. In applications in which the temperature of the fluid to be guided exceeds 80° C., PVDF homopolymers or PVDF copolymers are generally used as liner at temperatures up to about 135° C. If the limit for the use of a polymeric inner layer is not occasioned by the operating temperature but by the chemical stability of the polymer, merely a thin inner protective layer stable toward the fluid is generally sufficient as liner, which may likewise consist of PVDF homo- or copolymers.

In the TCPs currently in development, preferably single-layer liners of PA12 or PEEK are used, and, in combination with these, glass or carbon fiber tapes with a matrix of the same polymer. Owing to its specific properties and owing to the high material costs, however, PEEK is used only where extremely high demands are placed on thermal and chemical stability. In the moderate temperature range, liners composed of PVDF or PA12 and tapes with a PA12 matrix are used. However, a PA12 tape does not readily adhere to a PVDF liner with the requisite bonding force. This problem can be solved by producing, for example, a multilayer liner with an inner layer of PVDF, an adhesion promoter layer and an outer PA12 layer. In the case of such a construction, however, three layer interfaces are created (PVDF/adhesion promoter, adhesion promoter/PA12, PA12/tape), which can become weak points under extreme operating conditions (see, inter alia, DNV-GL Recommended Practice RP F119 "Thermoplastic Composite Pipes"). The aim must thus be to reduce the number of critical layer interfaces in such a TCP to a minimum.

A further aspect of the underlying problem is therefore that of providing thermoplastic composite pipes having a minimum of layer interfaces with one or more reinforcing plies of an easily produced composite with a PVDF matrix and good fiber-matrix adhesion.

The composites according to the invention, the shaped bodies according to the invention, for example the thermoplastic composite pipes (TCPs) comprising the composites according to the invention, and the use according to the invention are described by way of example hereinafter, without any intention that the invention be restricted to these illustrative embodiments. When ranges, general formulae or classes of compounds are specified below, these are intended to encompass not only the corresponding ranges or groups of compounds which are explicitly mentioned but also all subranges and subgroups of compounds which can be obtained by leaving out individual values (ranges) or compounds. Where documents are cited within the context of the present description, the entire content thereof is intended to be part of the disclosure of the present invention. Where percentage figures are given hereinafter, unless stated otherwise, these are figures in % by weight. In the case of compositions, the percentage figures are based on the entire composition unless otherwise stated. Where average values are given hereinafter, unless stated otherwise, these are mass averages (weight averages). Where measured values are given hereinafter, unless stated otherwise, these measured values were determined at a pressure of 101 325 Pa and at a temperature of 25° C.

The first aspect of the underlying problem is solved by the subject-matter of the present application, which is a composite composed of a polymer matrix and continuous fibers embedded therein, wherein the polymer matrix consists to an extent of at least 80% by weight, preferably to an extent of at least 85% by weight, more preferably to an extent of at least 90% by weight and especially preferably to an extent of at least 95% by weight of a mixture comprising the following components:

a) low-viscosity PVDF as the main component, i.e. to an extent of at least 50 parts by weight, and
b) 1 to 50 parts by weight, preferably 1.5 to 40 parts by weight, more preferably 2 to 30 parts by weight, particularly preferably 2.5 to 20 parts by weight and especially preferably 3 to 10 parts by weight of an acrylate copolymer, where the acrylate copolymer contains 1% to 30% by weight, preferably 2% to 25% by weight, more preferably 4% to 20% by weight and especially preferably 5% to 15% by weight of units having carboxylic anhydride units,
where the sum total of the parts by weight of a) and b) is 100, and
where the proportion by volume of the continuous fibers in the composite is additionally 10% to 80%, preferably 15% to 75%, more preferably 20% to 70%, even more preferably 25% to 65%, particularly preferably 30% to 60%, and especially preferably 35% to 55%;
where the percentages of the polymer matrix and of the continuous fibers are each based on the total mass or total volume of the composite.

EP 0673762A2 (U.S. Pat. No. 5,554,426A) discloses that PVDF and acrylate copolymer are compatible and homogeneously miscible with one another and, as a blend, have good adhesion to a polyamide layer. It is also mentioned therein that this molding compound can be rendered electrically conductive, especially by addition of carbon black, carbon fibers and the like. The conductivity additives do not serve for reinforcement; only carbon black is used in the examples. There is no disclosure of fiber-matrix adhesion. The layer in question in EP 0673762A2 is therefore not a composite in the sense of this invention.

The composite according to the invention is a fiber composite material that may be in the form of a semifinished product, or a finished part manufactured therefrom. A semifinished product directly after production is in the form of a strand that may have any desired geometry. It may be for example a sheet, a tape, a plate, a round profile, a rectangular profile or a complex profile.

Continuous fibers are those having a length of more than 50 mm. In general, they are significantly longer. In the context of the invention, they are used in the form of a roving or of a weave. In principle, suitable fibers are all those of sufficient length that have a softening temperature and thermal stability above the processing temperature of the matrix molding compound of about 250° C.; it is possible to use inorganic fibers, polymer fibers and natural fibers, and combinations with one another. Examples of suitable fibers are metal fibers, glass fibers, preferably glass fibers of S1 glass, S2 glass, carbon fibers, metallized carbon fibers, boron fibers, ceramic fibers (for example of $Al_2O_3$ or $SiO_2$), basalt fibers, silicon carbide fibers, potassium titanate fibers, aramid fibers, fibers of liquid-crystalline polyester, polyacrylonitrile fibers and fibers of polymers such as polyimide, polyetherimide, polyphenylene sulfide, poly-p-phenylenebenzobisoxazole (PBO), polyetherketone, polyetheretherketone and the like. Glass fibers should preferably not contain any boron oxide or titanium dioxide since these may lead to autocatalytic degradation of the PVDF. Glass fibers containing substances having similar properties are preferably likewise ruled out.

The cross section of the fibers may for example be circular, rectangular, oval, elliptical, or cocoon-shaped. The diameter is preferably 5 μm to 25 Particular preference is given to fibers having a circular cross section with a diameter of 5 to 25 mm.

With fibers of cross section deviating from the circular shape (for example flat glass fibers) it is possible to achieve a higher fill level of fiber in the finished part, and thus higher strength. Commercially available fibers usually contain, on their surface, a size that provides functional groups for binding to a polymer matrix. For the purpose of the invention, a size may be helpful, but it is not required in principle. Preference is given to using sized fibers; the size is more preferably reactive toward the polymer matrix. Carbon fibers are preferred; sized carbon fibers are more preferred. Especially preferred sized carbon fibers are those where the size contains epoxy groups.

SUMMARY

More preferably, the composite includes 20% to 60% by volume, particularly preferably 30% to 55% by volume and especially preferably 40% to 50% by volume, based on the composite, of carbon fibers. Even more preferably, the composite includes 30% to 55% by volume of carbon fibers having an epoxy size, based on the composite.

DETAILED DESCRIPTION

PVDF is known to the person skilled in the art as polyvinylidene fluoride and is commercially available in a multitude of types. PVDF may be a homopolymer or a copolymer. According to the invention, polyvinylidene fluoride used may be copolymers based on vinylidene fluoride that include up to 40% by weight of units that derive from the monomers trifluoroethylene, chlorotrifluoroethylene, ethylene, propene and hexafluoropropene. Preferably, the polyvinylidene fluoride is a homopolymer of vinylidene fluoride.

The PVDF is preferably a low-viscosity PVDF; the low-viscosity PVDF preferably has a melt flow index (MFI) of 18 to 50 grams/10 min, preferably 20 to 45 grams/10 min, using 2.16 kg (230° C.), and determining the MFI to ASTM D1238-13.

PVDFs having lower MFI lead to poorer impregnation of the fiber material and to an increase in the porosity of the polymer matrix. In addition, only smaller proportions of fiber material in a composite are achievable. Overall, the lower MFI thus leads to a deterioration in the mechanical properties of the composite. These properties can be determined, for example, by means of ASTM D2344-16.

The acrylate copolymer b) preferably contains the following units:
I. 14% to 80% by weight, preferably 20% to 70%, more preferably 30% to 65% and especially preferably 40% to 60% by weight of ester units of the formula

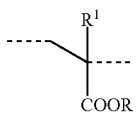

with R=methyl, ethyl, propyl or butyl, $R^1$=hydrogen or methyl;

II. 10% to 75% by weight, preferably 20% to 65%, more preferably 25% to 50% and especially preferably 30% to 40% by weight of imide units of the formula

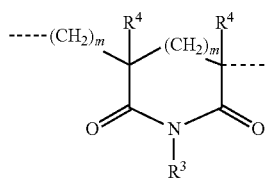

with $R^4$=independently aliphatic or alicyclic radicals having 1 to 8 carbon atoms, preferably having 1 to 4 carbon atoms, more preferably hydrogen or methyl, and $R^3$=independently methyl, ethyl, propyl, butyl or phenyl;

preferably both $R^3$ and $R^4$ are methyl;

m=0 or 1;

III. 1% to 20% by weight, more preferably 1.5% to 15% and especially preferably 2% to 5% by weight of acid units of the formula

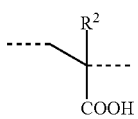

with $R^2$=hydrogen or methyl;

IV. 1% to 30% by weight, preferably 2% to 25%, more preferably 4% to 20% and especially preferably 5% to 15% by weight of acid anhydride units of the formula

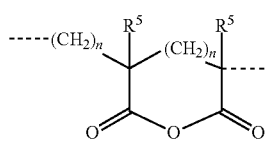

with $R^5$=independently aliphatic or alicyclic radicals having 1 to 8 carbon atoms, preferably having 1 to 4 carbon atoms, more preferably hydrogen or methyl;

n=0 or 1;

where the units I, II, III and IV add up to a total of 100% by weight.

The acrylate copolymer b) may additionally contain further units, for example those that derive from maleic esters, fumaric esters, itaconic esters, vinyl acetate, vinylpyrrolidone, vinyl chloride, acrylonitrile, acrylamide, styrene or ethene, provided that this does not significantly impair compatibility with the PVDF and the desired adhesion-promoting effect.

The reason for the limitation in chain length for the substituents $R^2$, $R^4$ and $R^5$ is that longer alkyl radicals lead to a reduced glass transition temperature and hence to reduced heat distortion resistance. This might be accepted in the individual case; such embodiments are at least within the scope of equivalence of the invention.

The ester units I derive, for example, from methyl acrylate, ethyl acrylate, n-butyl acrylate, methyl methacrylate, n-propyl methacrylate or i-butyl methacrylate, preference being given to methyl methacrylate.

The imide units II, in the case that m=0, derive from optionally substituted maleimides such as maleimide, N-methylmaleimide, N-ethylmaleimide, N-phenylmaleimide or N-methylcitraconimide. In the case that m=1, they derive from reaction of two units of the formula I or III that are adjacent in a polymer with ammonia or a primary amine to form an imide.

The acid units III derive from acrylic acid or methacrylic acid.

The anhydride units IV (when n=0) preferably derive from unsaturated dicarboxylic anhydrides such as maleic anhydride, methacrylic anhydride and acrylic anhydride, more preferably from methacrylic anhydride. In the case that n=1, they derive from elimination of water from two units III that are adjacent in a polymer with ring closure.

Further anhydride units may derive from itaconic anhydride and aconitic acid.

More preferably, the acrylate copolymer b) has exclusively the units I, II, III and IV. Preferably, the $R^1$, $R^2$, $R^4$ and $R^5$ radicals in the acrylate copolymer are all the same, more preferably all methyl.

Owing to the presence of units II, such copolymers are referred to as polyacrylimides or polymethacrylimides, or sometimes also as polyglutarimides. These are products proceeding from polyalkylacrylates or polyalkylmethacrylates in which two adjacent carboxylate groups have been converted to a cyclic acid imide. The imide formation is preferably conducted with ammonia or primary amines, for example methylamine, in the presence of water, with concomitant formation of the units III and IV by hydrolysis.

The products and the preparation thereof are known (Hans R. Kricheldorf, Handbook of Polymer Synthesis, Part A, Verlag Marcel Dekker Inc. New York-Basle-Hong Kong, p. 223 ff.; H. G. Elias, Makromoleküle [Macromolecules], Huthig and Wepf Verlag Basle-Heidelberg-New York; U.S. Pat. Nos. 2,146,209, 4,246,374).

The acrylate copolymer preferably has 40% to 60% by weight of units I, 30% to 40% by weight of units II, 2% to 5% by weight of units III, and 5% to 15% by weight of units IV.

The polymer matrix preferably contains low-viscosity PVDF and 2% to 30% by weight, more preferably 2.5% to 20% by weight and especially preferably 3% to 10% by weight of an acrylate copolymer, based on the polymer matrix, where the acrylate copolymer includes 40% to 60% by weight of units I, 30% to 40% by weight of units II, 2% to 5% by weight of units III and 5% to 15% by weight of units IV, with units I, II, III and IV totaling 100.

Preferably, the composites according to the invention include 30% to 55% by volume, based on the composite, of carbon fibers having an epoxy resin size in a polymer matrix composed of a low-viscosity homo-PVDF and 5% to 10% by weight of an acrylate copolymer, based on the polymer matrix, where the acrylate copolymer includes 40% to 60% by weight of units I, 30% to 40% by weight of units II, 2% to 5% by weight of units III and 5% to 15% by weight of units IV, with units I, II, III and IV totaling 100.

The polymer matrix may, as well as the low-viscosity PVDF and the acrylate copolymer, contain customary auxiliaries and additives, for example impact modifiers (for instance acrylate rubber), flame retardants, stabilizers, plasticizers, processing auxiliaries, dyes, pigments or the like. The amount of the agents mentioned should be dosed such that the desired properties, especially in relation to the binding of the fiber materials to the matrix, are not significantly impaired.

The polymer matrix is produced by the customary and known methods by mixing of melts of the components in an efficiently kneading mixing unit, for example a twin-screw extruder, at temperatures that are guided by the melting points of the components, generally at temperatures between 200 and 300° C.

The composite according to the invention can be produced by prior art methods. The production of unidirectionally continuous fiber-reinforced tapes is described in detail, for example, in EP 0056703A1, U.S. Pat. Nos. 5,002,712A, 4,883,625A, US 2014/0191437A1, US 2013/0333788A1 and WO 2014/140025. Possible production methods proceeding from rovings or weaves are, for example, melt application, impregnation with a polymer solution and removal of the solvent, film impregnation or powder impregnation (US 2018001516A1, WO 2016/156222, WO 2016/173886).

The composite obtained in this way may, in suitable form, already be the end product. In the other cases, it is a semifinished product that can be processed further to give the finished part with the aid of suitable shaping methods. Illustrative finished parts are construction parts for aircraft, rockets or motor vehicles, or thermoplastic composite pipes containing such a composite as reinforcing ply.

In addition, it is possible to cut a composite obtained as a strand to give elongate long-fiber-reinforced pellets having a length of 4 to 60 mm, preferably 5 to 50 mm, particularly preferably 6 to 40 mm, especially preferably 5 to 30 mm and very particularly preferably 6 to 25 mm. In these elongate long-fiber-reinforced pellets, the reinforcing fibers are arranged in axial direction and extend from the first cut face to the second cut face.

These pellets can then be used to produce moldings by means of injection molding, extrusion, compression molding or other familiar shaping processes, and particularly good properties of the molding are achieved here with gentle processing methods. In this context the term "gentle" is to be understood as meaning especially that undue fiber breakage and the attendant severe reduction in fiber length are largely avoided. In the case of injection molding this means that it is preferable to use screws of large diameter and low compression ratio and also generously dimensioned nozzle channels and gate channels. A supplementary condition that should be ensured is that the elongate pellets melt rapidly with the aid of high cylinder temperatures (contact heating), and that the fibers are not excessively comminuted by undue levels of shear. When these measures are observed, the moldings obtained have a higher average fiber length than comparable moldings produced from short-fiber-reinforced molding compositions. This achieves a significant improvement in properties, in particular tensile modulus of elasticity, ultimate tensile strength and notched impact resistance.

Preferred semifinished products are tapes; these have preferably been unidirectionally reinforced with continuous fibers. Preferably, the tape has a width of 5 to 600 mm and preferably a width of 8 to 300 mm, while the thickness is typically in the range from 0.05 to 2 mm, preferably in the range from 0.1 to 1 mm, more preferably in the range from 0.125 to 0.5 mm and particularly preferably in the range from 0.15 to 0.35 mm.

Preferred composites consist of continuous fiber-reinforced tape layers, with a number of individual layers of 1 to 100, more preferably of 5 to 90 individual layers, where the composite is formed by application of pressure and elevated temperature, more preferably by consolidation, as shown in the examples, and where the individual layers may have any desired fiber orientations.

The second aspect of the underlying problem is solved by a further part of the subject-matter of the present invention, a thermoplastic composite pipe (TCP) comprising the following components from the inside outward:

I. a tubular liner having one or more layers, the outer surface of which consists of a polyamide molding compound or PVDF molding compound;

II. a reinforcing ply composed of a composite composed of a polymer matrix and continuous fibers embedded therein, where the polymer matrix consists to an extent of at least 80% by weight, preferably to an extent of at least 85% by weight, more preferably to an extent of at least 90% by weight and especially preferably to an extent of at least 95% by weight of a mixture comprising the following components:

a) low-viscosity PVDF as the main component, i.e. to an extent of at least 50 parts by weight, and b) 1 to 50 parts by weight, preferably 1.5 to 40 parts by weight, more preferably 2 to 30 parts by weight, particularly preferably 2.5 to 20 parts by weight and especially preferably 3 to 10 parts by weight of an acrylate copolymer, where the acrylate copolymer contains 1% to 30% by weight, preferably 2% to 25% by weight, more preferably 4% to 20% by weight and especially preferably 5% to 15% by weight of units having carboxylic anhydride groups, wherein the sum of the parts by weight of a) and b) is 100, and where the proportion by volume of the continuous fibers in the composite is additionally 10% to 80%, preferably 15% to 75%, more preferably 20% to 70%, even more preferably 25% to 65%, particularly preferably 30% to 60%, and especially preferably 35% to 55%, where the percentages of the polymer matrix and of the continuous fibers are each based on the total mass or total volume of the reinforcing ply;

III. optionally a further reinforcing ply of a composite composed of a polyamide matrix and continuous fibers embedded therein, where the polyamide matrix consists to an extent of at least 80% by weight, preferably to an extent of at least 85% by weight, more preferably to an extent of at least 90% by weight and especially preferably to an extent of at least 95% by weight of polyamide, and where the proportion by volume of the continuous fibers in the composite is additionally 10% to 80%, preferably 15% to 75%, more preferably 20% to 70%, even more preferably 25% to 65%, particularly preferably 30% to 60%, and especially preferably 35% to 55%, where the percentages of the polyamide matrix and of the continuous fibers are each based on the total mass or total volume of the reinforcing ply;

IV. optionally an outer cover ply composed of a polymeric material.

Preferably, layer II is a reinforcing ply composed of the composite according to the invention as described above.

The tubular liner generally has an internal diameter in the range from 10 to 500 mm, preferably in the range from 12 to 425 mm and more preferably in the range from 15 to 300 mm. Its wall thickness is generally in the range from 2 to 40 mm, preferably in the range from 2.5 to 30 mm and more preferably in the range from 3 to 20 mm. The liner may have a single layer or multiple layers.

In the production of the TCP, the composite according to the invention in the form of a tape is applied to the outer surface of the liner with application of a contact pressure. The necessary contact pressure can be achieved through the winding tension or by means of a contact body. Here, in one embodiment, the two contact faces are melted at the surface, for example by means of infrared radiation, hot air, hot gas, laser radiation, microwave radiation, or directly by contact heating. The partly molten contact surfaces are then pressed against one another. The contact pressure should then be maintained until the molten regions have solidified. In a further embodiment, the tape is wound up and then melted from the outside, either indirectly or else directly by means of a heatable contact body. The heating output has to be calibrated such that the outer surface of the liner also starts to melt here. Thereafter, the contact pressure is maintained until the regions melted have solidified. The winding of the tape and the winding of any further tape plies is prior art. It is optionally possible in the same way to apply one or more tape plies with a polyamide matrix to the structure thus obtained. This is advisable under some circumstances because the outer region of the TCP is exposed to a lesser degree to the medium to be conveyed and its temperature, and in this way the material costs can be kept lower and the overall pipe is lighter. Polyamides are known to the person skilled in the art as very impact-resistant polymers and therefore offer better and additional protection against environmental influences; in addition, polyamide has a lower density than PVDF.

The overall composite ply, i.e. the sum total of all the tape plies, here is in the range from 1 to 100 mm, preferably in the range from 5 to 90 mm and more preferably in the range from 10 to 80 mm. For different tape plies, it is possible to use different tape geometries and winding angles. The tapes used may have any suitable cross section.

In order to protect the outer tape ply, it is optionally possible to finally apply an outer cover ply of a polymeric material. This is either a thermoplastic molding compound or a thermoplastic or crosslinkable or crosslinked elastomer. The cover ply preferably adheres firmly to the outer tape ply. In this case, the cover ply may be applied, for example, by means of a crosshead extrusion die and hence be cohesively bonded to the tape ply. Adhesion can also be generated by crosslinking of a crosslinkable elastomer.

Specific designs of the TCP according to the invention are, for example:
a) liner of a polyamide molding compound/inventive PVDF composite layer/cover ply of a polyamide molding compound;
b) liner of a PVDF molding compound/inventive PVDF composite layer/cover ply of a PVDF molding compound;
c) liner of a PVDF molding compound/inventive PVDF composite layer/cover ply of a polyamide molding compound;
d) liner of a polyamide molding compound/inventive PVDF composite layer/cover ply of a PVDF molding compound;
e) two-layer liner with an inner layer of a polyamide molding compound and an outer layer of a PVDF/acrylate copolymer blend/inventive PVDF composite layer/layer of a PVDF/acrylate copolymer blend/cover ply of a polyamide molding compound;
f) two-layer liner with an inner layer of a polyamide molding compound and an outer layer of a PVDF/acrylate copolymer blend/inventive PVDF composite layer/cover ply of a PVDF molding compound;
g) liner of a PVDF or polyamide molding compound/inventive PVDF composite layer/composite layer with polyamide matrix/cover ply of a PVDF or polyamide molding compound.

The acrylate copolymer in designs e and f has the same composition here as the acrylate copolymer b) of the composite according to the invention.

Suitable polyamides are, for example, PA6, PA66, PA610, PA88, PA8, PA612, PA810, PA108, PA9, PA613, PA614, PA812, PA128, PA1010, PA10, PA814, PA148, PA1012, PA11, PA1014, PA1212 and PA12, or a polyetheramide or polyetheresteramide based on these polyamides, or a polyphthalamide, for example PA66/6T, PA6/6T, PA6T/MPMDT (MPMD stands for 2-methylpentamethylenediamine), PA9T, PA10T, PA11T, PA12T, PA14T, PA6T/61, PA6T/10T, PA6T/12, PA10T/11, PA10T/12 or PA612/6T.

What is advantageous about the TCP according to the invention with the reinforcement composed of the composite according to the invention is that the polymer matrix softens to a lesser degree as a result of absorption of hydrocarbons, water or methanol compared to a matrix of polyolefin or polyamide. Thus, the TCP according to the invention has a higher outer compressive strength compared to comparable pipes made of polyolefin or polyamide. The good fiber-matrix adhesion is additionally particularly advantageous, which contributes significantly to high reinforcement and to long lifetime. A measure of fiber-matrix adhesion can be considered to be the three-point bending test according to ASTM D2344-16, as described in the examples.

A further advantage of the TCP according to the invention is that no additional promotion of adhesion is needed between the PVDF composite ply according to the invention and any polyamide ply present.

The TCP according to the invention is especially suitable for offshore applications in oil or gas production, for instance for transport of the products to platforms, for connection to steel pipes, as a transport pipe and especially as an umbilical, as a riser, as a jumper line, as a flowline, as an intervention line, as a downline, as an injection line or as a pressure line. It can be used for the transport of possibly pressurized hydrocarbons or mixtures thereof, such as crude oil, crude gas, triphase (i.e. oil/gas/water mixture), processed oil (already partly processed at the seabed), processed gas, gasoline or diesel, of injection media such as water (for instance to maintain the pressure in the cavern), oilfield chemicals, methanol or $CO_2$, and for conduction of hydraulic oils (for example for actuators at the seabed). Furthermore, the TCP according to the invention is also suitable as a pressure-conducting line in the onshore sector or in other industrial applications, especially in those where relatively high forces have to be transmitted in the axial pipe direction with force-fitting bonding between the pipe and connection element.

EXAMPLES

Tape consisting of 45% by volume of carbon fibers (Grafil 34-700 D) in a polymer matrix that has been produced from 95% by weight of a low-viscosity homo-PVDF (Solef 1006) mixed with 5% by weight of an acrylate copolymer including 10.1% by weight of acid anhydrides (IV), 2.9% by weight of acid groups (III), 35% by weight of amide groups (II) and 52% by weight of methacrylate groups (I) without further additives.

After consolidation of eight unidirectional plies of the above tape to give the semifinished product (10 bar, 240° C., hold time 5 minutes), interlaminar shear strength determined to ASTM D2344-16 on planar test specimens was found to be 59 MPa.

No detachment of the matrix from the carbon fibers was observed in the test specimens up to the value specified; this test thus gives a statement with regard to the adhesion of matrix and continuous fibers.

For comparison, a semifinished product was constructed analogously to the working example, but without using an acrylate copolymer. After comparable consolidation of the semifinished product, interlaminar shear strength determined to ASTM D2344-16 was found to be 17 MPa.

The invention claimed is:

1. A composite comprising:
a polymer matrix and
continuous fibers embedded therein,
wherein the polymer matrix has a content of at least 80% by weight of a mixture comprising the following components:
(a) low-viscosity polyvinylidene fluoride (PVDF) as the main component, present in a content of at least 50 parts by weight, and
(b) from 1 to 50 parts by weight of an acrylate copolymer, wherein the acrylate copolymer contains from 1% to 30% by weight of units having carboxylic anhydride units,
wherein the sum total of the parts by weight of a) and b) is 100,
wherein the proportion by volume of the continuous fibers in the composite is from 10% to 80%, and
wherein the low-viscosity polyvinylidene fluoride (PVDF) has a melt flow index of from 18 to 50 g/10 min.

2. The composite according to claim 1, wherein the PVDF is a homopolymer or a copolymer.

3. The composite according to claim 2, wherein the composite is a unidirectionally continuous fiber-reinforced tape.

4. The composite according to claim 2, wherein the composite is a plurality of elongate long-fiber-reinforced pellets having a length of from 4 to 60 mm, produced by cutting the composite in strand form.

5. The composite according to claim 1, wherein the acrylate copolymer comprises the following units:
(I) from 14% to 80% by weight of ester units of the formula

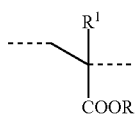

with R is methyl, ethyl, propyl or butyl, $R^1$ is hydrogen or methyl;
(II) from 10% to 75% by weight of imide units of the formula

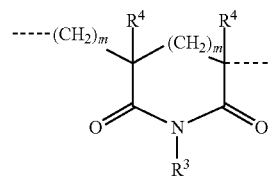

wherein $R^4$ is independently hydrogen or aliphatic or alicyclic radicals having 1 to 8 carbon atoms, and
$R^3$ is independently methyl, ethyl, propyl, butyl or phenyl;
m is 0 or 1;
(III) from 1% to 20% by weight of acid units of the formula

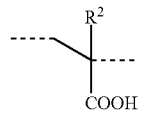

with $R^2$ is hydrogen or methyl;
(IV) from 1% to 30% by weight of acid anhydride units of the formula

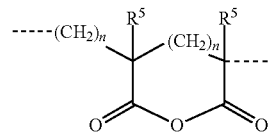

with $R^5$ is independently aliphatic or alicyclic radicals having 1 to 8 carbon atoms;
n=0 or 1;
where the units (I), (II), (III), and (IV) add up to a total of 100% by weight.

6. The composite according to claim 5,
wherein R is methyl,
$R^1$ is hydrogen, and
$R^4$ is independently aliphatic or alicyclic radicals having 1 to 4 carbon atoms.

7. The composite according to claim 5,
wherein R is methyl,
$R^1$ is methyl, and
$R^4$ is hydrogen or methyl.

8. The composite according to claim 5,
wherein R is methyl,
$R^1$ is hydrogen, and
$R^4$ is hydrogen.

9. The composite according to claim 5, wherein the composite is a unidirectionally continuous fiber-reinforced tape.

10. The composite according to claim 5, wherein the composite is a plurality of elongate long-fiber-reinforced pellets having a length of from 4 to 60 mm, produced by cutting the composite in strand form.

11. The composite according to claim 1, wherein the composite is a unidirectionally continuous fiber-reinforced tape.

12. The composite according to claim 11, wherein the composite is a plurality of elongate long-fiber-reinforced pellets having a length of from 4 to 60 mm, produced by cutting the composite in strand form.

13. The composite according to claim 1, wherein the composite is a plurality of elongate long-fiber-reinforced pellets having a length of from 4 to 60 mm, produced by cutting the composite in strand form.

14. An article comprising the composite according to claim 1, wherein the article is a thermoplastic composite pipe (TCP) comprising the following components from the inside outward:
- (I) a tubular liner having one or more layers, the outer surface of which consists of a PVDF molding compound;
- (II) a reinforcing ply composed of the composite
- (IV) optionally an outer cover ply composed of a polymeric material.

15. The article according to claim 14, wherein
a design of the TCP is selected from the group consisting of:
- (b) liner of a PVDF molding compound/inventive PVDF composite layer/cover ply of a PVDF molding compound;
- (e) two-layer liner with an inner layer of a polyamide molding compound and an outer layer of a PVDF/acrylate copolymer blend/inventive PVDF composite layer/layer of a PVDF/acrylate copolymer blend/cover ply of a polyamide molding compound; and
- (f) two-layer liner with an inner layer of a polyamide molding compound and an outer layer of a PVDF/acrylate copolymer blend/inventive PVDF composite layer/cover ply of a PVDF molding compound.

16. The article according to claim 15, wherein the TCP is an umbilical, a riser, a jumper line, a flowline, an intervention line, a downline, an injection line or a pressure line.

17. A process, comprising:
transporting a fluid through the article according to claim 15,
wherein the fluid is selected from the group consisting of crude oil, crude gas, triphase, processed oil, processed gas, gasoline, diesel, injection media, and hydraulic oils.

18. The article according to claim 14, wherein the TCP is an umbilical, a riser, a jumper line, a flowline, an intervention line, a downline, an injection line or a pressure line.

19. A process, comprising:
transporting a fluid through the article according to claim 18,
wherein the fluid is selected from the group consisting of crude oil, crude gas, triphase, processed oil, processed gas, gasoline, diesel, injection media, and hydraulic oils.

20. A process, comprising:
transporting a fluid through the article according to claim 14,
wherein the fluid is selected from the group consisting of crude oil, crude gas, triphase, processed oil, processed gas, gasoline, diesel, injection media, and hydraulic oils.

21. The composite according to claim 1, wherein the low-viscosity polyvinylidene fluoride (PVDF) has a melt flow index of from 20 to 45 g/10 min.

* * * * *